(12) United States Patent
Williams

(10) Patent No.: US 7,178,857 B2
(45) Date of Patent: Feb. 20, 2007

(54) CAMPING SYSTEM WITH CARGO CAPACITY

(75) Inventor: Marty Williams, Colorado Springs, CO (US)

(73) Assignee: Let's Go Aero, Inc., Colorado Springs, CO (US)

( * ) Notice: Subject to any disclaimer, the term of this patent is extended or adjusted under 35 U.S.C. 154(b) by 17 days.

(21) Appl. No.: 10/904,282

(22) Filed: Nov. 2, 2004

(65) Prior Publication Data

US 2006/0091698 A1 May 4, 2006

(51) Int. Cl.
*B60P 3/35* (2006.01)

(52) U.S. Cl. ............ 296/173; 296/156; 296/158; 296/159; 296/163; 296/165; 296/168

(58) Field of Classification Search ............ 296/156, 296/158, 159, 163, 165, 164, 168, 172, 173, 296/176

See application file for complete search history.

(56) References Cited

U.S. PATENT DOCUMENTS

| | | | | |
|---|---|---|---|---|
| 2,788,238 A * | 4/1957 | Baird | ............ | 296/164 |
| 4,294,484 A * | 10/1981 | Robertson | ............ | 296/156 |
| 5,462,330 A * | 10/1995 | Brown | ............ | 296/172 |
| 6,604,777 B2 * | 8/2003 | Neville | ............ | 296/164 |
| 6,712,422 B1 * | 3/2004 | Vaillancourt | ............ | 296/165 |
| 6,722,726 B1 | 4/2004 | Parmer | ............ | 296/157 |
| 6,739,617 B1 | 5/2004 | Martin | ............ | 280/656 |
| 2003/0184055 A1 | 10/2003 | Badger | ............ | 280/656 |
| 2005/0017540 A1 * | 1/2005 | Leigh | ............ | 296/173 |

* cited by examiner

*Primary Examiner*—Lori L. Coletta
(74) *Attorney, Agent, or Firm*—Glenn L. Webb

(57) ABSTRACT

A camping system convertible between a transporting configuration and a camping configuration. The system includes a large storage compartment to allow storage of large items such as all terrain vehicles, motorcycles, bicycles and other large items even when in the compact transporting configuration. The system includes side walls that pivot upward and outward to create side compartments for sleeping or other uses.

12 Claims, 11 Drawing Sheets

CAMPING SYSTEM WITH CARGO CAPACITY

FIELD OF THE INVENTION

This invention relates to the field of tent trailers and particularly to the field of cargo carrying capacity for tent trailers.

BACKGROUND OF THE INVENTION

Camping has been become increasingly more popular in recent years. Camping itself may take many forms. These forms range from backpacking with minimal impact to full scale recreational vehicles with all of the comforts of home. One intermediate form of camping that has greatly grown is the use of tent trailers. Tent trailers are compact towed trailers that either pop-up or fold-out to form sleeping and/or living quarters. There have been numerous different designs of these types of tent trailers in the past that are able to be converted from an erect tent position to a compact towing configuration.

One problem with the previous tent trailer designs is the lack of storage capacity. Once these tent trailers have been converted to the towing position, there is little or no room for the storage of large items. This has particularly become a problem in recent years with the increased use of recreational items at campsites. Often, it is necessary or desirable to bring along extensive items, particularly if there are numerous parties involved, if there is an extended stay planned, or if a particular planned activity requires large items. This can range from camping supplies, hunting supplies or other items.

One example of this problem is the use of all terrain vehicles, motorcycles, snowmobiles, personal watercraft or bicycles. Many recreational areas promote the use of such items at or near popular camping areas. Also, these items are frequently used for hunting, fishing and other activities.

The transporting of these items is frequently an issue with tent trailers. Common tent trailers have no capacity for storing these items. Thus, it is necessary to transport these items in the back of a pick-up which greatly reduces the people and storage capacity of the vehicle, or bring additional vehicles to pull a trailer or otherwise transport these items.

One attempt to solve this problem is to secure the items on the top deck of a tent trailer while it is in the towing configuration. An example of this attempt is illustrated in U.S. Patent Application Publication 2003/01 84055 and in U.S. Pat. No. 6,739,617. Mounting apparatus are provided on the upper deck of a tent trailer to secure ATVs or other large items.

Another attempt to solve this problem is disclosed in U.S. Pat. No. 6,722,726 issued to Parmer. This patent discloses a toy-hauling tent trailer that provides an interior cargo space in both the stowed and erected positions of the tent. The roof is raised upward with side panels that swing up or out to form side extensions to the tent.

Another problem that arises with many of these previous tent trailers is the difficulty in raising the tent. Often there are complicated bracing systems that are necessary to configure before the tent is usable as quarters.

Another problem is the lack of head space in the side compartment regions. There typically is only enough room to sit up at best.

Thus there is presently a need for a tent trailer that combines living and sleeping quarters with storage capacity.

SUMMARY OF THE INVENTION

The present invention provides a camping system that provides storage for large items such as all terrain vehicles, motorcycles, bicycles, camping items, hunting equipment, military equipment and other large items. The system also converts from a relatively compact structure to a relatively large camping structure with multiple compartments. The system is lightweight yet high strength and capable of carrying large heavy items even though the system itself is lightweight.

The camping system of a preferred embodiment includes a chassis that has a relatively large storage compartment. The storage compartment is sufficiently large enough that all terrain vehicles, motorcycles, personal watercraft, snowmobiles, bicycles, hunting equipment, camping equipment, expedition equipment or other items can be safely and securely stored and transported. The rear wall of the chassis may be pivoted downward, in a preferred embodiment, to form a loading ramp.

The camping system of a preferred embodiment includes an upper frame on the chassis. The system includes opposing side walls that are pivotally attached to a center portion of the upper frame. The opposing side walls include a substantially L shape. This shape causes the side walls to not only pivot upward but outward at the same time to form an extended compartment on each side of the chassis. A bottom member is inserted into the bottom portion of these extended compartments to form a sleeping or storage compartment. The side walls include a cover that fully covers the extended compartment.

The camping system of a preferred embodiment also includes a front wall pivotally attached to the upper frame on the chassis. This front wall can pivot upward into a horizontal position to form an additional compartment. The system can also include a front wall on the chassis that pivots downward into a horizontal position as well. A cover encloses this front extended compartment to form a front vestibule.

A preferred embodiment of the present invention includes a rear wall that pivots upward into a horizontal position. A cover encloses the extended rear wall to create a rear vestibule. The rear wall, in one preferred embodiment may be pivoted either upward to form the rear compartment or downward to create a loading ramp.

Another preferred embodiment of the present invention includes an axle and wheel assembly on the chassis to allow the camping system to be towed behind a vehicle.

The camping system of another preferred embodiment utilizes the cargo compartment of a pick-up as the chassis. The pivotal side walls and pivotal rear wall then can be used to form a convertible camping system on the pick-up.

The camping system of a preferred embodiment may be removably attached to a trailer system. This allows the trailer to be utilized without the camping system.

These and other features of the present invention are evident from the ensuing detailed description of preferred embodiments and from the drawings.

BRIEF DESCRIPTION OF THE DRAWINGS

FIG. 15 is a perspective view of the camping system of a preferred embodiment mounted onto a pick-up vehicle.

DETAILED DESCRIPTION OF PREFERRED EMBODIMENTS

The present invention, in a preferred embodiment, provides an improved trailer system that includes storage capacity for large items. A preferred embodiment of the present invention is described below. It is to be expressly understood that this descriptive embodiment is provided for explanatory purposes only, and is not meant to unduly limit the scope of the present invention as set forth in the claims. Other embodiments of the present invention are considered to be within the scope of the claimed inventions, including not only those embodiments that would be within the scope of one skilled in the art, but also as encompassed in technology developed in the future.

A preferred embodiment of an improved tent trailer system of the present invention is illustrated in FIGS. 1–12. This preferred embodiment is described for use in carrying large items such as ATVs, snowmobiles, personal watercraft and other related items but it is expressly noted that other items may be used with the present invention. Also, the tent trailer system of the present invention may also be scaled down or up in size as desired.

Figure 1:
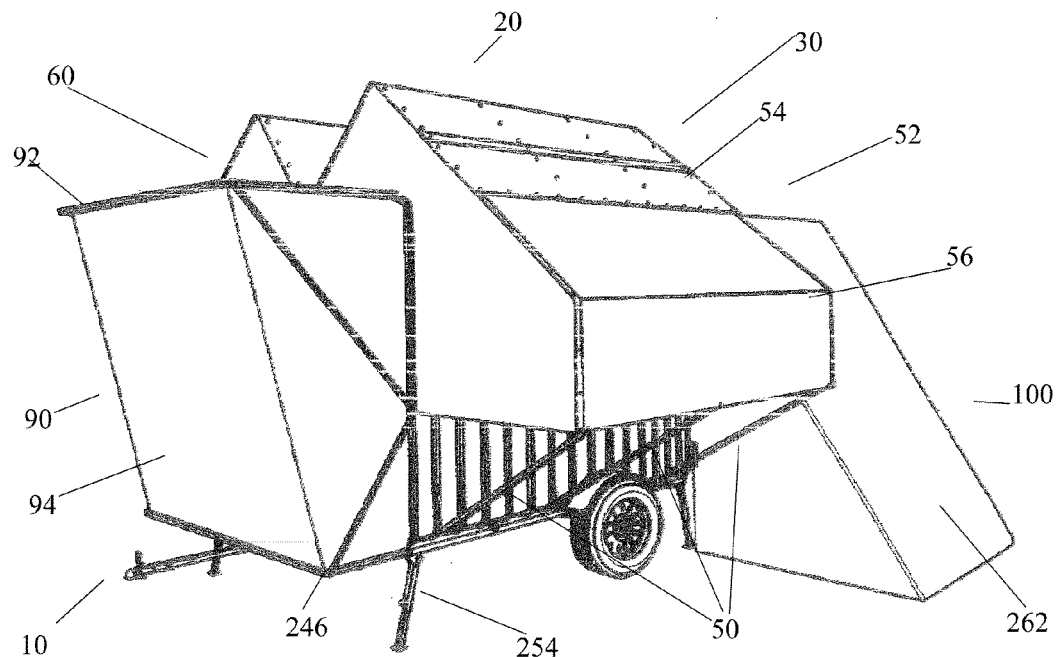
FIG. 1 is a perspective view of the camping system of a preferred embodiment of the present invention in the extended configuration.
Figure 2:
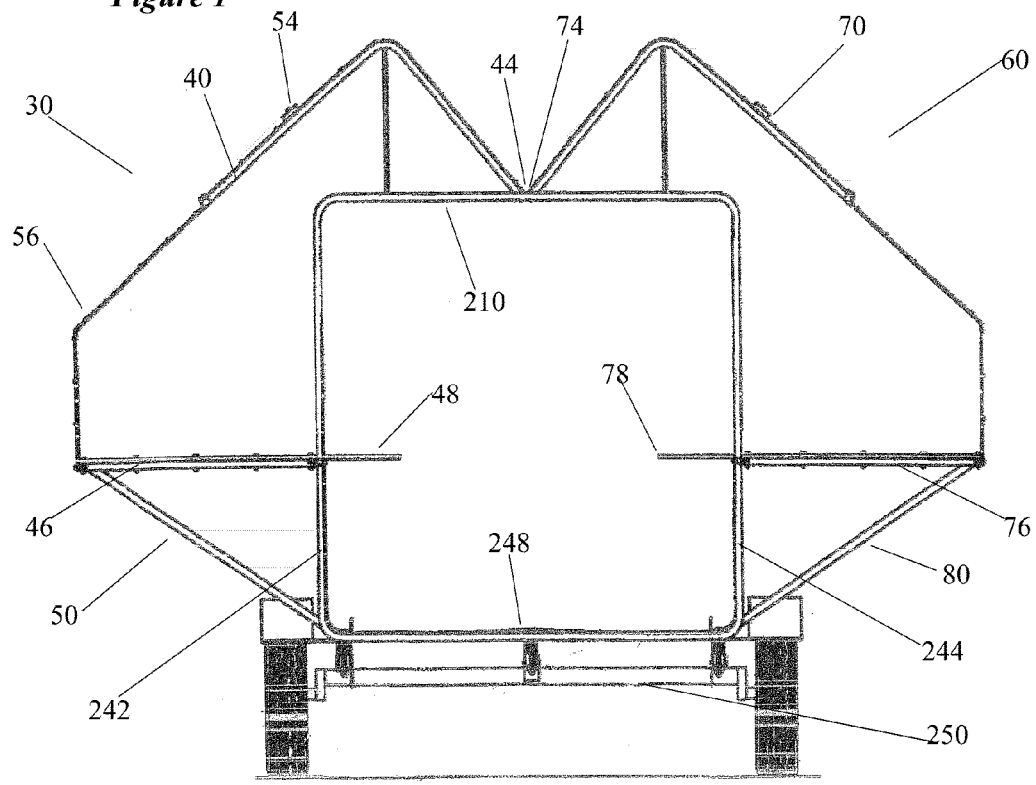
FIG. 2 is a rear view of the camping system of the embodiment of FIG. 1.

The preferred embodiment of the improved tent trailer system is illustrated in FIGS. 1 and 2 as trailer 10. Trailer system 10 of this preferred embodiment utilizes a unique trailer chassis 200 as described in greater detail below. The tent structure 20 in itself in this preferred embodiment provides a unique system that provides greater living quarters than traditional tent trailer structures as well as a simple set up process while providing greater storage capacity when stowed than previous systems.

Figure 3:
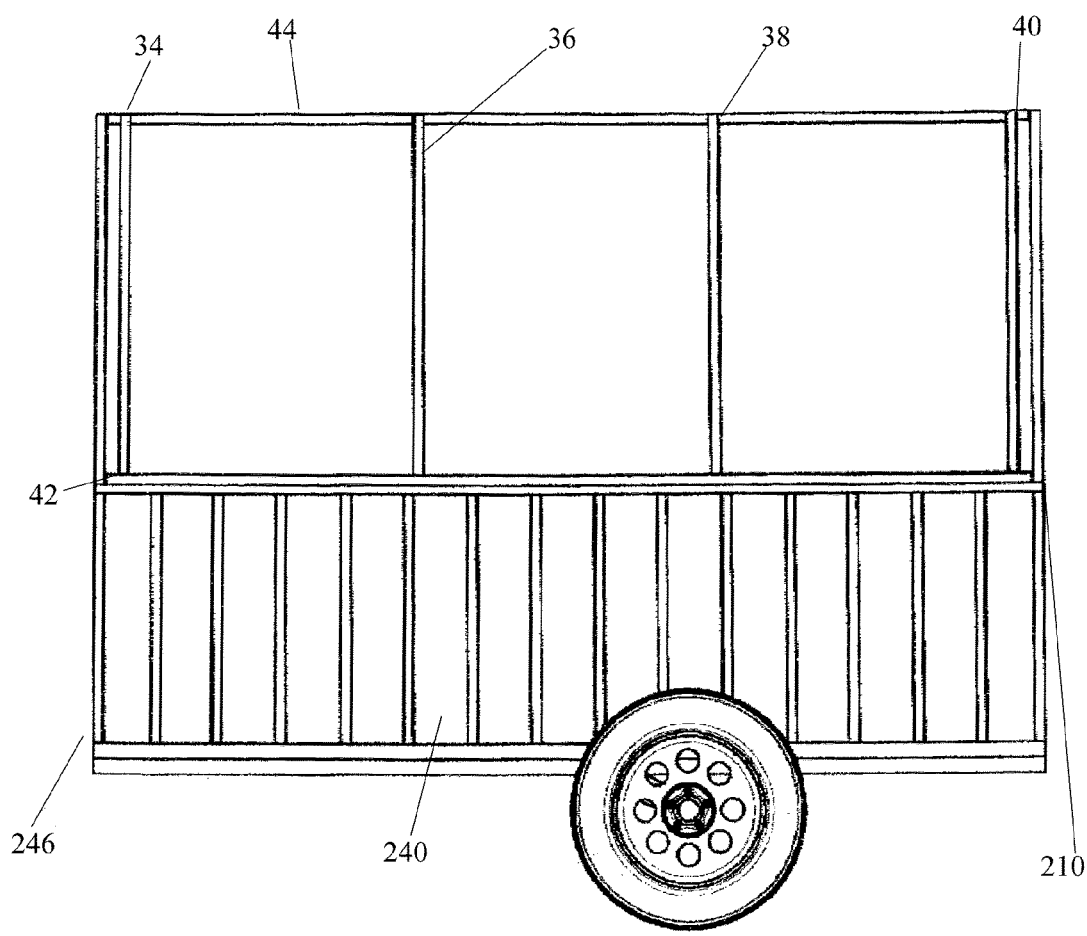
FIG. 3 is a side view of the exposed structural elements of the embodiment of FIG. 1.
Figure 4:
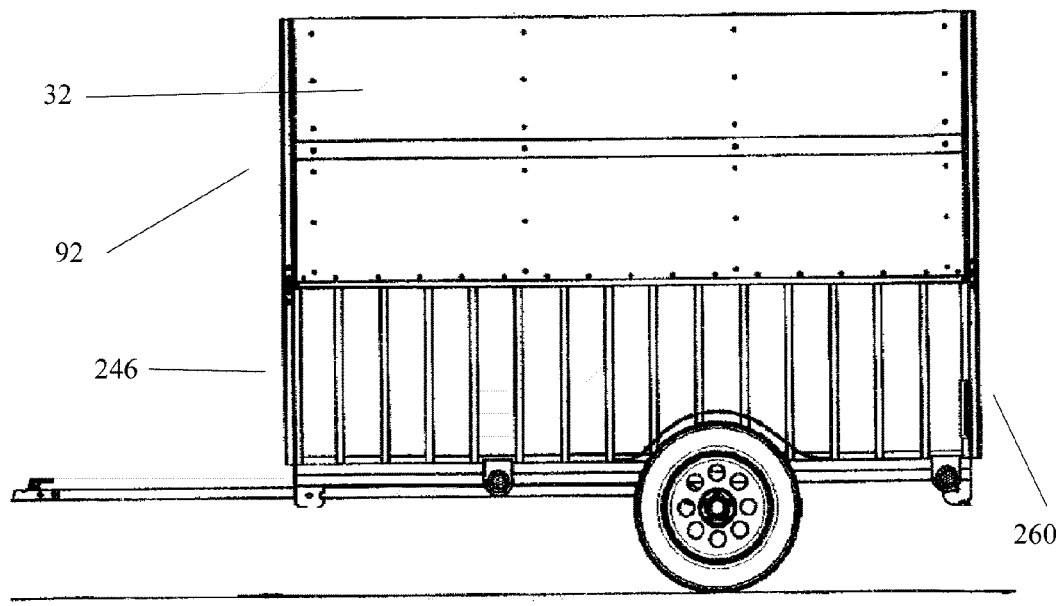
FIG. 4 is a side view of the embodiment of FIG. 1 in the closed position.

The trailer system 10 in the stowed position shown in FIGS. 3 and 4 forms a rectangular box like structure. However, when set up in the tent position as shown in FIG. 1, the tent 20 provides two side compartments 30, 60 for sleeping or other uses, a large center compartment for a table and chairs, additional sleeping, storage or other uses, a front vestibule 90 for additional sleeping, storage or other uses and a rear vestibule 100 for storage, changing clothes or other uses.

The tent 20 of this preferred embodiment quickly sets up into the spacious position of FIGS. 1 and 2 by the use of a unique gull wing tent structure. This structure is able to open up to provide the side compartments 30, 60 while closing up to provide a compact stowed position without taking up internal storage capacity. The gull wing structure forms the side walls of the box structure of the trailer when stowed while pivoting upward and outward to form the side compartments 30, 60.

The side walls 32, 62 of the trailer are formed in a substantial L shape. In the preferred embodiment shown in FIG. 3, those side walls include side wall members 34, 36, 38, 40 and 64, 66, 68, 70 respectively. These members are, in this embodiment, formed of hollow square tubing. However, it is to be expressly understood that other materials could be used as well including aluminum, plastic, wood as well as solid materials. Also, while four side wall members are discussed for each side wall, this number can be changed depending on the size of the side wall, covering material, stability and other design choices. The side wall members 34–40 and 64–70 are secured on their lower ends to bottom members 42 and 72, respectively and to upper members 44 and 74, respectively.

In this preferred embodiment, the side walls 32, 62 are secured within the trailer chassis framework 200. This framework includes rear frame 210 formed in a substantial rectangular shape and front frame 220 formed in a substantial rectangular shape. The trailer chassis 200 also includes lower body portion 240 that includes side walls 242, 244, front wall 246 and floor 248. The front wall 246 is pivotally attached at its lower end to the trailer chassis 200 or floor 248. This structure can that of a conventional trailer chassis or in another preferred embodiment discussed below, can be a unique trailer as well. The lower trailer body portion is mounted by convention mechanisms to an axle and wheel assembly 250. Extendible leveling jacks 254 are pivotally mounted on the underside of the trailer chassis.

The upper members 44, 74 of the side walls 40, 60 are pivotally mounted between the rear frame 210 and front frame 220. This allows the side walls 40, 60 to pivot upward from the lower trailer body portion 240 as well as outward to open up the side walls of the tent trailer. Side wall bottom members 46, 76 then are extended horizontally from the upper surface of the lower trailer body portion 240. The bottom members 46, 76 can either be pivotally attached to the lower bottom members 42, 72 respectively to pivot into the horizontal position or else simply inserted into the horizontal position from a non-attached position. An extended plate 48, 78 may be secured on top of bottom members 46, 76 if additional bed space is needed. External brace members 50, 80 are used to secure the bottom members 46, 76 in the horizontal position.

Cover structures 52, 82 are attached over side wall members 34–40 and 64–70 to provide shelter. The cover structures can be plastic, canvas, wood, sheet metal or any other suitable material. In the preferred embodiment, the cover structures 52, 82 include two components, upper component 54, 84 and side component 56, 86. These components may be integral to one another and supported by a framework (not shown) or if the components are of a rigid material, then hinged, zipped or otherwise attached to one another.

Figure 5:
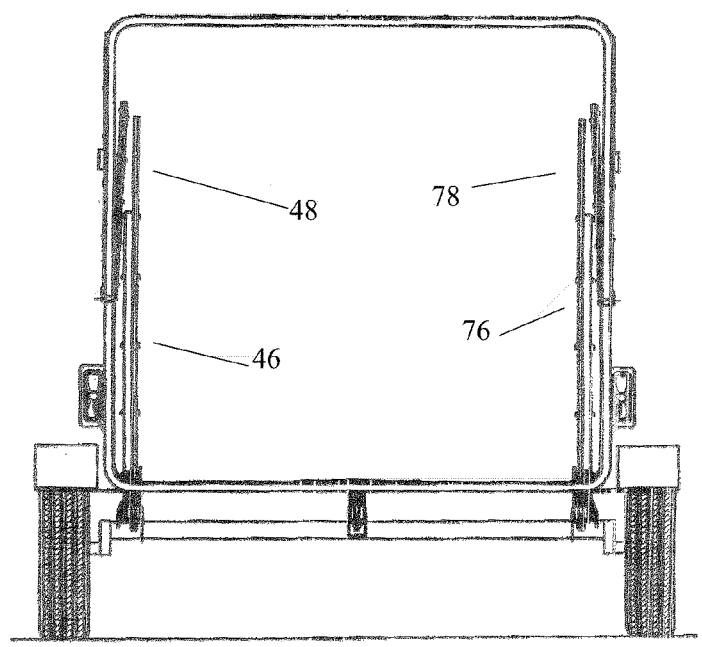
FIG. 5 is a rear cut-away view of the system of FIG. 3.
Figure 6:
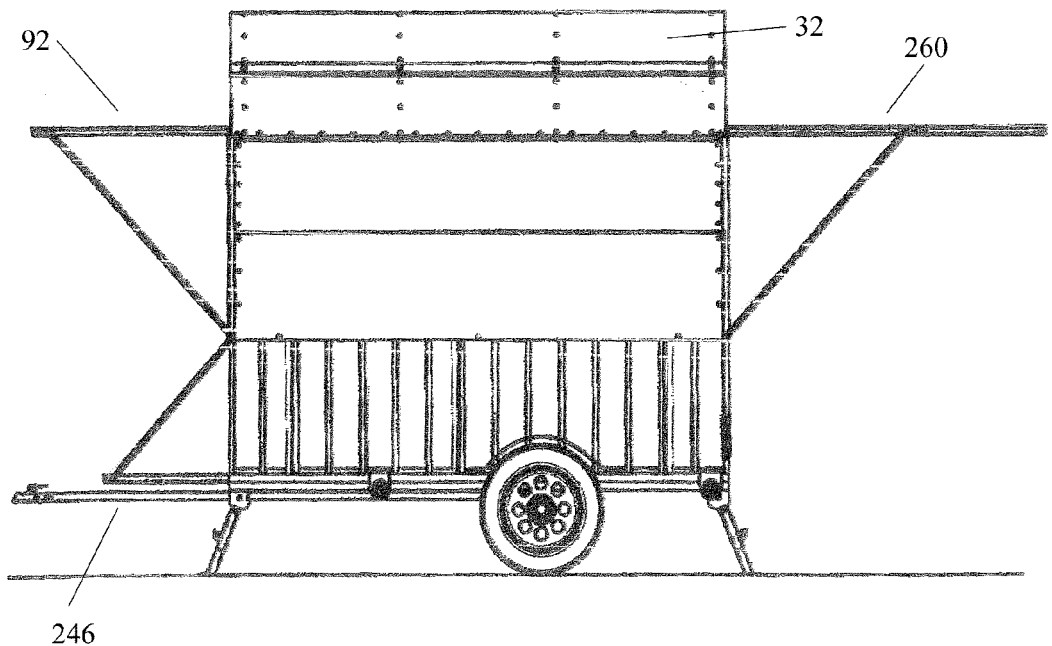
FIG. 6 is a side view of the open camper.

The tent structure 20 as shown in FIG. 5 also includes upper front wall 92 that is pivotally attached to front frame 220. The upper front wall 92 is thus able to pivot upward into a horizontal position where it can be secured by a framework, brace members or other types of mechanisms to hold it in this position. The lower front wall 246 of the trailer chassis also pivots downward into a horizontal position. A framework, brace members or other mechanism hold it into a horizontal position as well. The upper front wall 92 and lower front wall 246 are covered by canvas, wood, sheet metal, plastic or other suitable materials. An additional cover 94 also is either integral to those structures or can be additionally attached to the front wall 92 and lower front wall 246 when those walls are in the horizontal position to form the front vestibule 90.

The trailer chassis 200 also includes a rear wall 260 that is pivotally attached at the upper edge to the trailer rear frame 210. The rear wall 260 is thus able to pivot upward into a horizontal position. The rear wall 260 also includes a cover 262 as well formed from canvas, wood, metal sheet or other suitable materials. An additional cover is either formed integrally to the rear wall 260 or attachable to it to form a rear vestibule when the rear wall 260.

Figure 8:
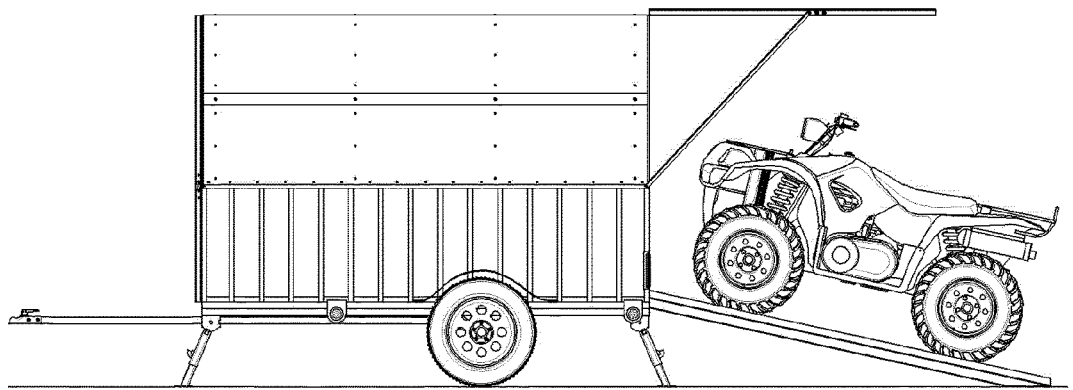
FIG. 8 is a view of an all terrain vehicle being loaded into the system.

In another preferred embodiment, the rear wall 260 is reinforced and also is pivoted on bottom edge as well. This pivot mechanism can be released to allow the rear wall to pivot upward to form the vestibule or the upper pivot mechanism can be released to allow the rear wall to pivot downward. When the rear wall is pivoted downward, it can be used as a loading ramp as shown in FIG. 8.

Figure 9:
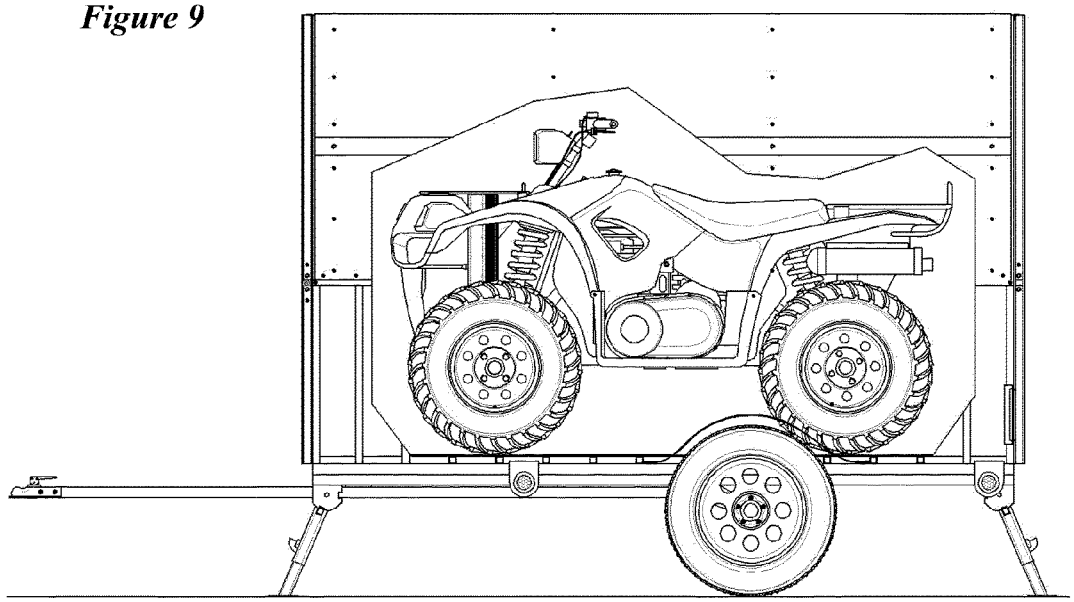
FIG. 9 is a cross-sectional view of the all terrain vehicle in the closed system.

The trailer system 10 can thus be towed in a relatively compact position as shown in FIGS. 3 and 4. Items, such as all terrain vehicles, motorcycles, personal watercraft, snowmobiles, bicycles, camping gear, hunting gear or any other equipment or items can be stowed within the central compartment in this configuration as shown in FIG. 9. Once the destination has been reached, the stored equipment can be easily unloaded by use of the rear wall in the ramp position. The leveling jacks 254 are pivoted downward and extended to level and support the trailer. Then the side walls 32, 42 are pivoted upward with the cover structures opening outward to create the side compartments 30, 40. The brace members can be used to secure bottom members in place as well as the side walls. The front wall 92 and lower front wall 246 are pivoted outward into horizontal position to form the front vestibule 90 while the rear wall 260 is pivoted outward into the horizontal position to create the rear vestibule 100.

Figure 7:
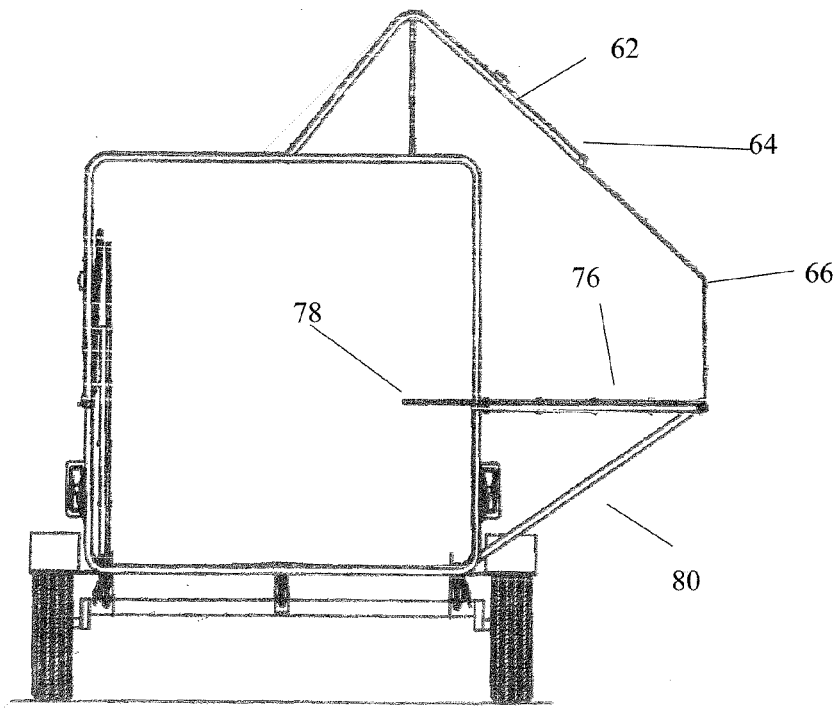
FIG. 7 is an end view of a partially open camper.
Figure 10:
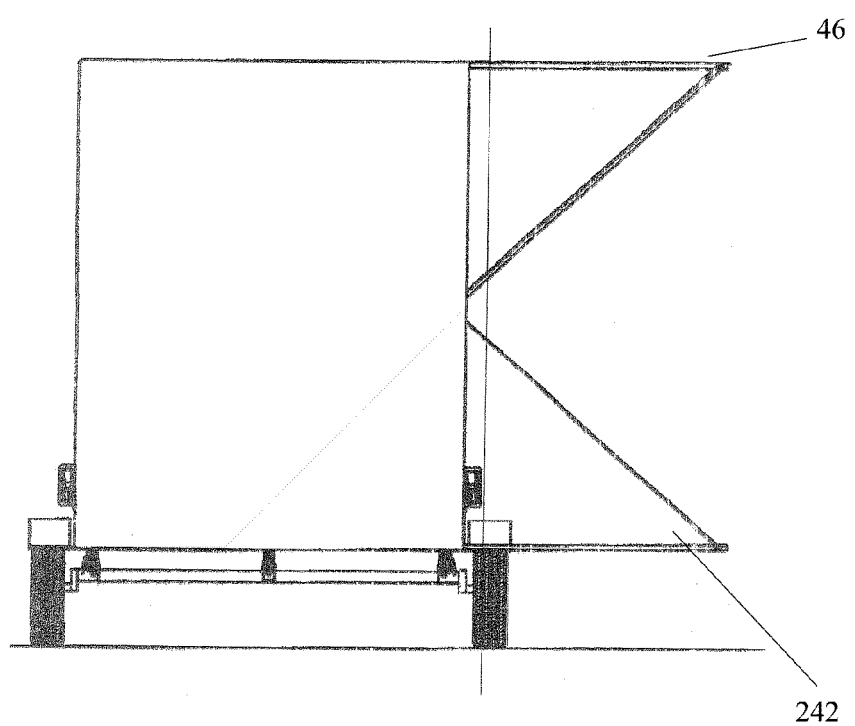
FIG. 10 is a perspective view of another embodiment of the camping system of the present invention.
Figure 11:
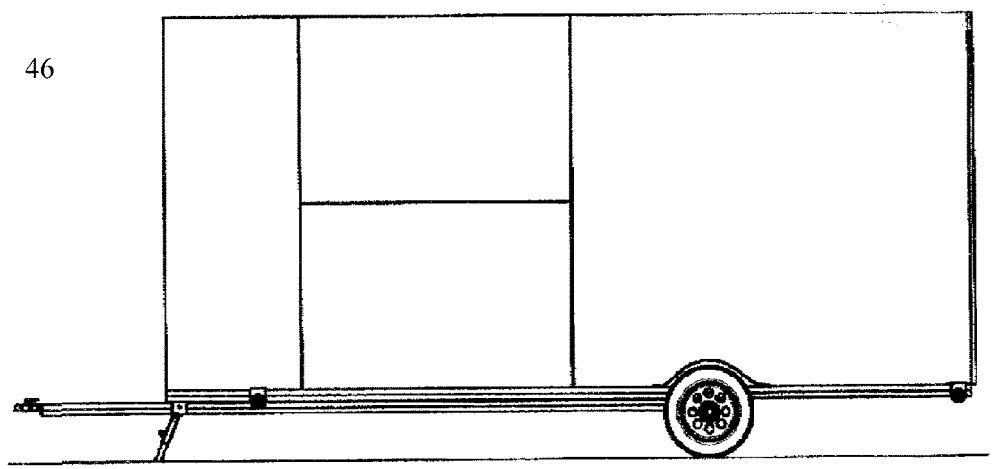
FIG. 11 is a side view of the embodiment of FIG. 9.
Figure 12:
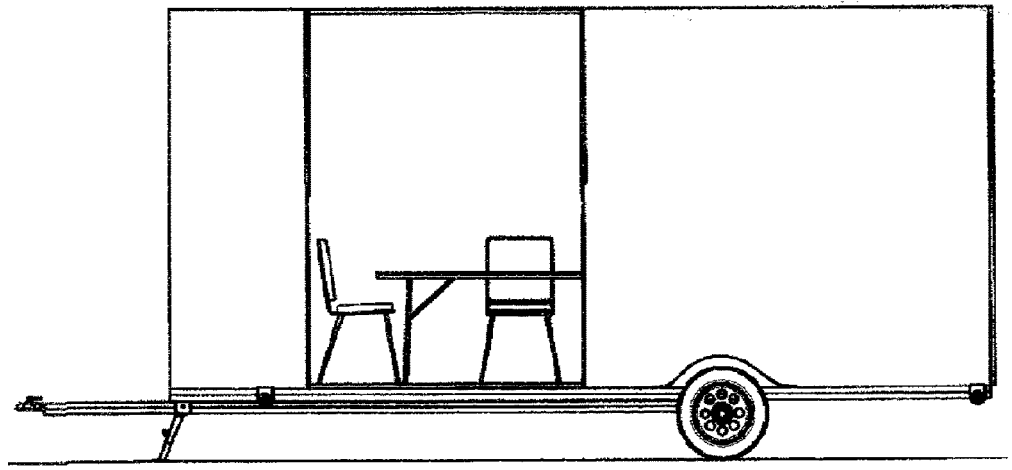
FIG. 12 is a side view of the embodiment of FIG. 9 with the door open.

The tent structure can also be used in a partially open configuration as shown in FIG. 7. Only one side wall member is extended while the other side wall is left closed. Additional tent structures may be attached to the tent trailer structure 20 as well to create even larger tent structures. Also, in an alternative embodiment, the lower side walls 242, 244 of the lower trailer chassis may be pivotally attached at their lower ends. This allows all or a portion of those side wall members to pivot downward to create additional space. The bottom members 46, 76 may be modified to create a door opening into the trailer, as shown in FIGS. 10–12.

Figure 13:
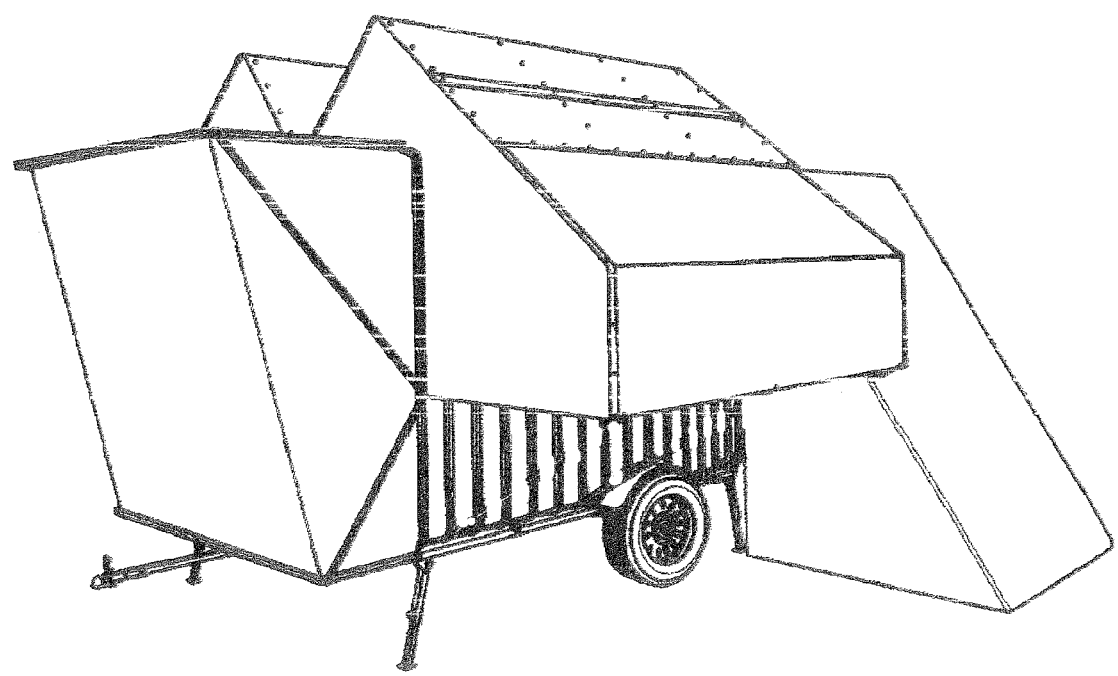
FIG. 13 is a perspective view of another embodiment of the camping system of the present invention mounted on a pick-up.
Figure 14:
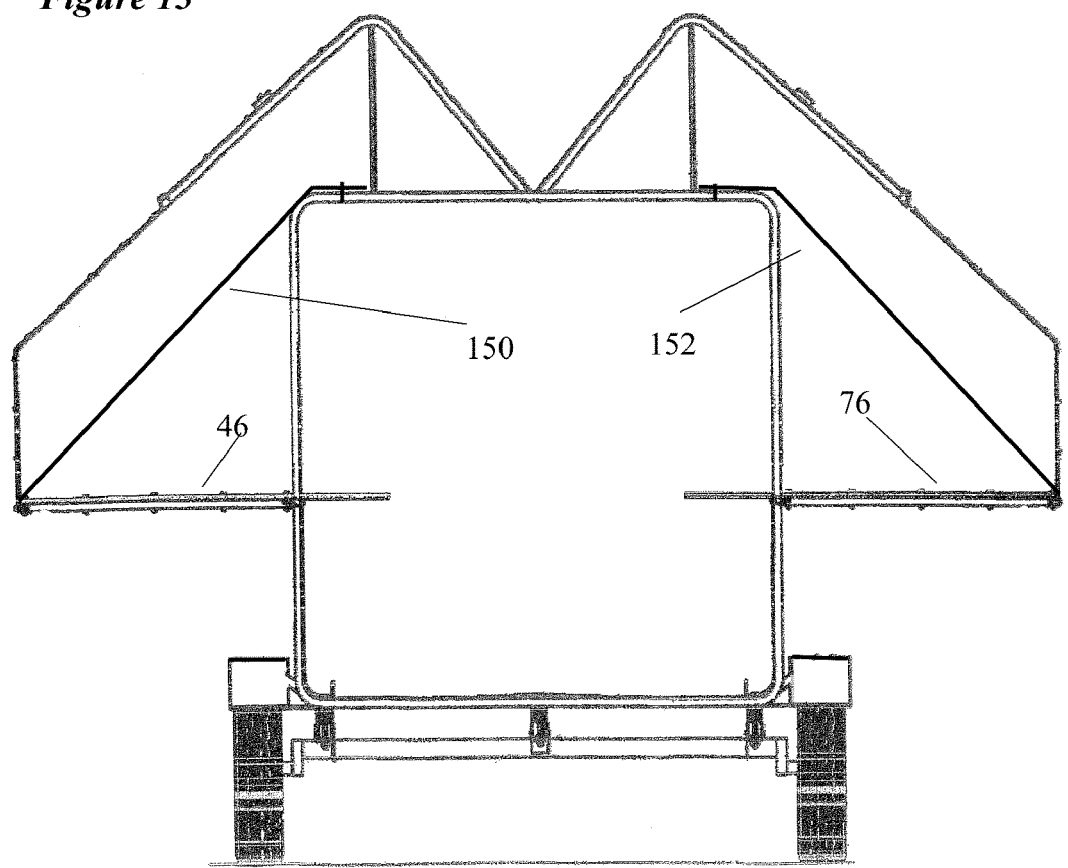
FIG. 14 is a perspective view of another embodiment of the camping system.
Figure 15:
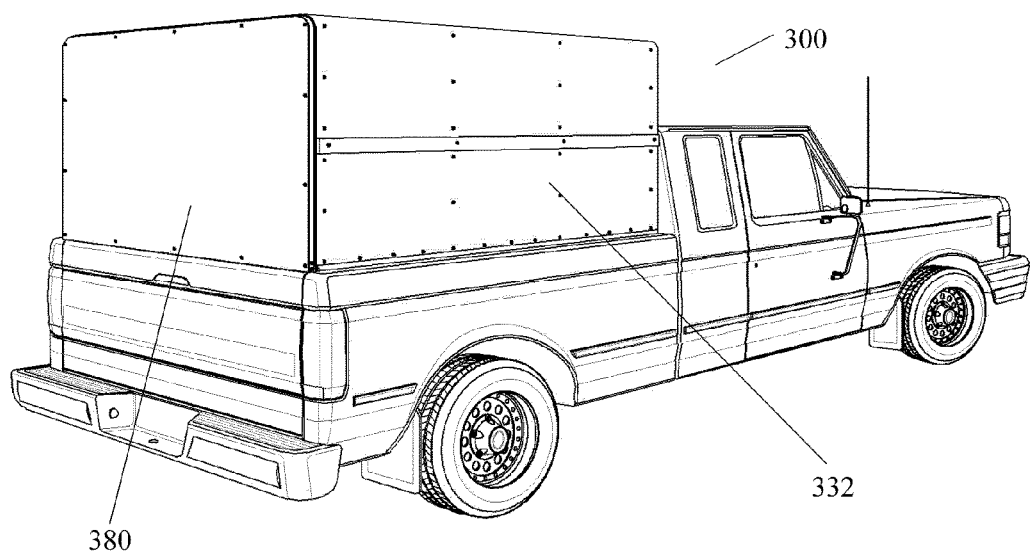
FIG. 15 is an end view of the system of FIG. 14.
Figure 16:
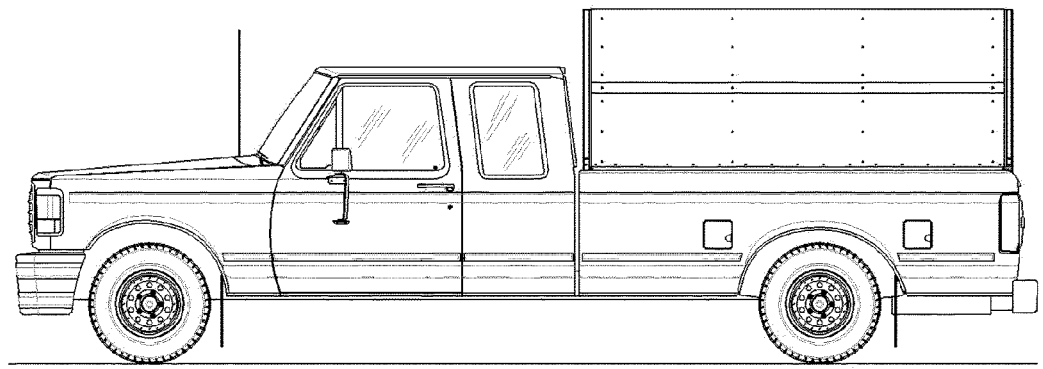
FIG. 16 is a side view of the system of FIG. 15.
Figure 17:
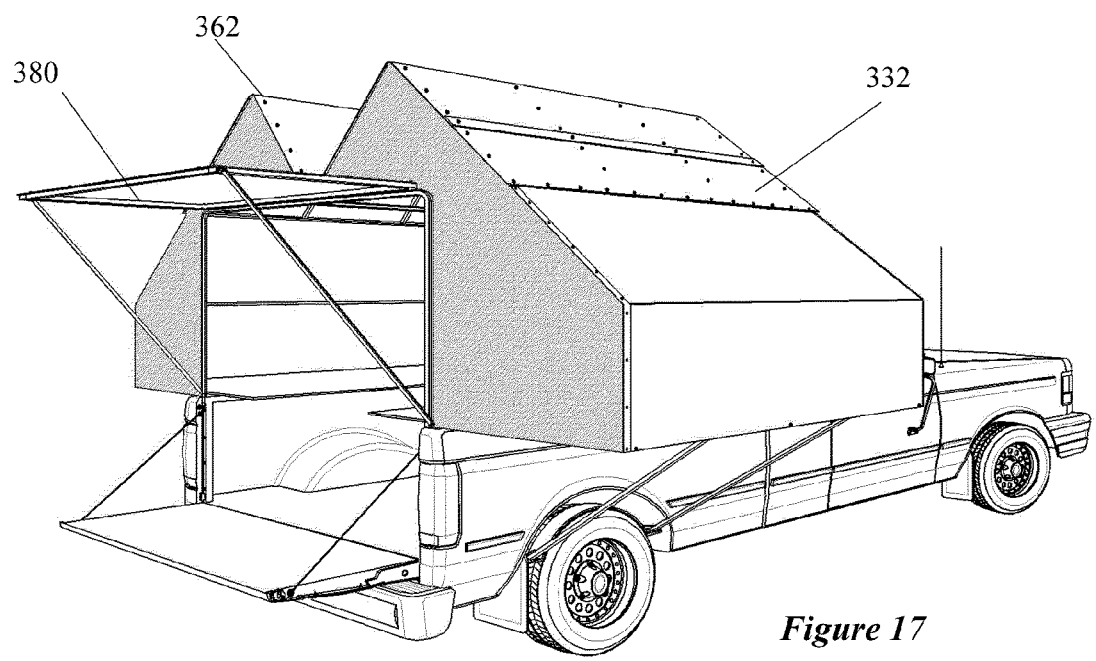
FIG. 17 is a perspective view of the system of FIG. 15 in an opened configuration.
Figure 18:
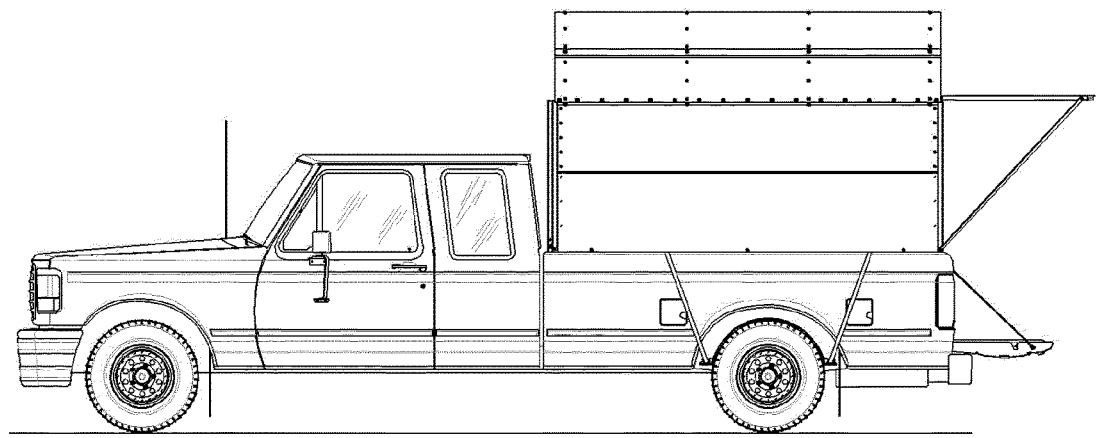
FIG. 18 is a side view of the embodiment of FIG. 17.
Figure 19:
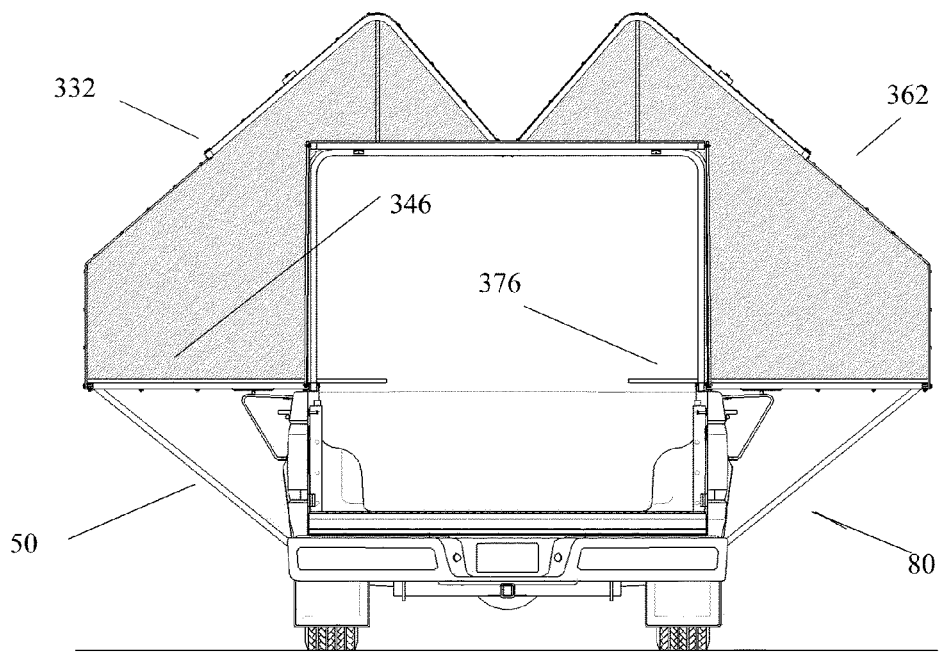
FIG. 19 is an end view of the embodiment of FIG. 17.

In another preferred embodiment illustrated in FIG. 13 and 14, the braces 50, 80 are eliminated. Instead, a cable structure 150, 152 is attached to the top of the trailer framework. The lower end of the cables is attached to outwardly extending end of the horizontal bottom members 46, 76 to hold those members in place. In this embodiment, there are cables at the front end of the trailer and at the rear end of the trailer.

In another preferred embodiment, shown in FIGS. 15–20, the upper tent structure 300 may be secured onto the cargo compartment of a pick-up vehicle. The bottom side members 342, 372 are mounted directly onto the side walls of the cargo compartment. The side walls 332, 362 operate in a manner similar to the above described embodiment. A rear wall 380 can be pivotally attached to the upper portion of the framework of the tent structure that will align with the tailgate of the cargo compartment to form a rear vestibule. This tent system is similar to the above described tent system except that it fits onto the cargo compartment of most standard sized pick-up vehicles.

Figure 20:
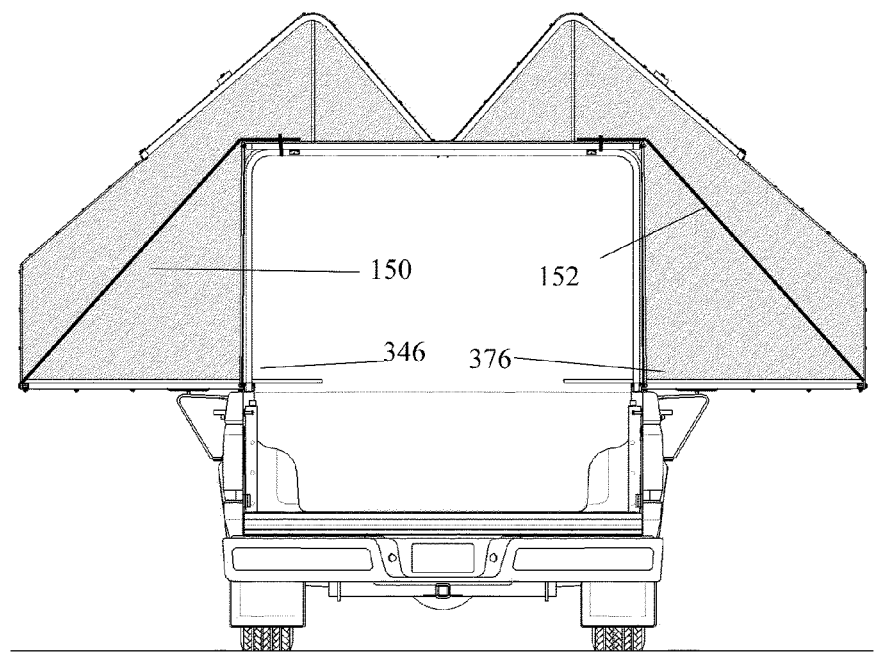
FIG. 20 is an end view of an alternative embodiment.

The bottom members 346, 376 can be secured in the horizontal position by either the external brace mechanism discussed above as shown in FIG. 19, by the cable system shown in FIG. 20, and discussed above or by other mechanism as well.

The trailer chassis 200 of the preferred embodiment includes a unique design. This chassis may be used with the above-described tent trailer, with conventional tent trailers using pop-up or fold-out designs, or used as utility trailer without the above described tent structure.

The above descriptions are not intended to limit the claimed invention but are merely provided for explanatory purposes. Other embodiments of the present invention are considered to be within the claimed inventions.

What is claimed is:

1. A camping system convertible between a compact traveling configuration to a camping configuration, said camping system comprising:
   a chassis having an open storage compartment;
   said chassis having a front wall, a rear wall and side walls to form said storage compartment;
   an upper frame attached to said chassis;
   a first side wall pivotally attached to a center portion of said upper frame to allow said first side wall to pivot upward and outward from said center portion;
   a second opposing side wall pivotally attached to said center portion to allow said second side wall to pivot upward and outward from said center portion; and
   cover materials attached to said first side wall and to said second side wall to form an extended camping structure.

2. The camping system of claim 1 wherein said chassis includes:
   an axle and wheel assembly to allow said camping system to be towed behind a vehicle.

3. The camping system of claim 1 wherein said chassis includes: a mounting assembly to mount said chassis to the cargo compartment of a pick-up vehicle.

4. The camping system of claim 1 wherein said system includes:
   a first bottom member extending horizontally from said chassis when said first side wall member is extended upward and outward to create a first side compartment; and
   a second bottom member extending horizontally from said chassis when said second side wall member is extended upward and outward to create a second side compartment.

5. A camping system convertible between a compact traveling configuration to a camping configuration, said camping system comprising:
   a chassis having an open storage compartment; said chassis having a front wall, a rear wall and side walls to form said storage compartment;
   an upper frame attached to said chassis;

a first side wall pivotally attached to a center portion of said upper frame to allow said first side wall to pivot upward and outward from said center portion;

a second opposing side wall pivotally attached to said center portion to allow said second side wall to pivot upward and outward from said center portion;

cover materials attached to said first side wall and to said second side wall to form an extended camping structure;

said front wall is pivotally attached to said chassis to pivot outward into a horizontal position; and a cover attached to said front wall to create a front compartment when said front wall is pivoted into said horizontal position.

6. The camping system of claim 5 wherein said system includes:

said front wall includes an upper front wall that is pivotally attached to said chassis to pivot outward into a horizontal position;

a pivotal attachment on said lower front wall of said chassis compartment to allow said lower front wall to pivot downward into a horizontal position; and a cover attached to said upper front wall and said lower front wall to create a front compartment when said upper front wall and said lower front wall are pivoted into said horizontal position.

7. A camping system convertible between a compact traveling configuration to a camping configuration, said camping system comprising:

a chassis having an open storage compartment; said chassis having a front wall, a rear wall and side walls to form said storage compartment;

an upper frame attached to said chassis;

a first side wall pivotally attached to a center portion of said upper frame to allow said first side wall to pivot upward and outward from said center portion;

a second opposing side wall pivotally attached to said center portion to allow said second side wall to pivot upward and outward from said center portion; cover materials attached to said first side wall and to said second side wall to form an extended camping structure;

said rear wall on said chassis pivots upward into a horizontal position; and a cover attached to said rear wall to create a rear compartment.

8. The camping system of claim 1 wherein said system includes:

A camping system convertible between a compact traveling configuration to a camping configuration, said camping system comprising:

a chassis having an open storage compartment;

said chassis having a front wall, a rear wall and side walls to form said storage compartment;

an upper frame attached to said chassis;

a first side wall pivotally attached to a center portion of said upper frame to allow said first side wall to pivot upward and outward from said center portion;

a second opposing side wall pivotally attached to said center portion to allow said second side wall to pivot upward and outward from said center portion;

cover materials attached to said first side wall and to said second side wall to form an extended camping structure; and said rear wall pivots downward to create a loading ramp for said chassis storage compartment.

9. The camping system of claim 1 wherein said system includes:

A camping system convertible between a compact traveling configuration to a camping configuration, said camping system comprising:

a chassis having an open storage compartment;

said chassis having a front wall, a rear wall and side walls to form said storage compartment;

an upper frame attached to said chassis;

a first side wall pivotally attached to a center portion of said upper frame to allow said first side wall to pivot upward and outward from said center portion;

a second opposing side wall pivotally attached to said center portion to allow said second side wall to pivot upward and outward from said center portion;

cover materials attached to said first side wall and to said second side wall to form an extended camping structure; and said rear wall pivots selectively downward to create a loading ramp and upward to create a rear compartment.

10. The camping system of claim 1 wherein said system includes:

said upper frame, first side wall and second side wall are removable from said chassis to allow said chassis to be utilized without said upper frame, first side wall and second side wall.

11. The camping system of claim 1 wherein said system includes:

at least portions of said side walls of said chassis are pivotally mounted to allow said at least portions of said side walls to pivot downward into a horizontal position to form additional compartments.

12. The camping system of claim 1 wherein said side walls include:

substantially L shaped members so the side walls pivot upward and outward away from said center frame.

* * * * *